Oct. 9, 1973  G. GERLACH  3,764,296
METHOD AND THE APPARATUS FOR CARRYING OUT METALLURGICAL
AND CHEMICAL PROCESSES
Filed March 30, 1970  4 Sheets-Sheet 1
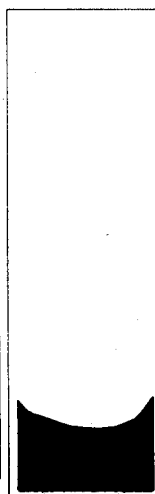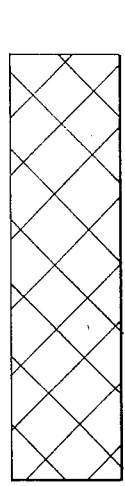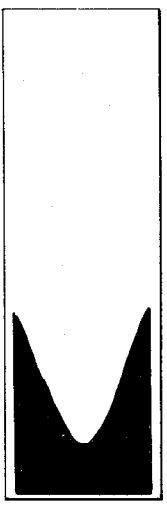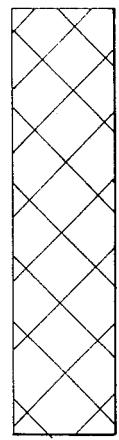
FIG. 1a  FIG. 1b
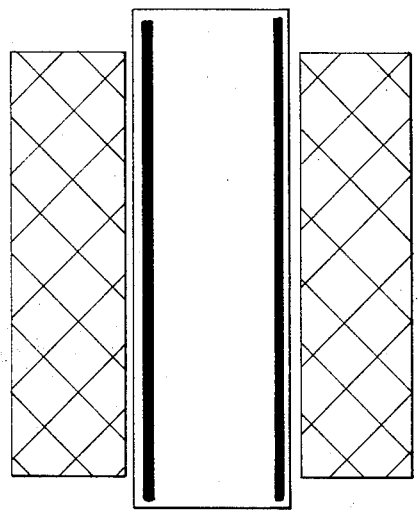
FIG. 1c
*INVENTOR.*
Gottfried Gerlach

INVENTOR.

Gottfried Gerlach

United States Patent Office 3,764,296
Patented Oct. 9, 1973

3,764,296
METHOD AND THE APPARATUS FOR CARRYING OUT METALLURGICAL AND CHEMICAL PROCESSES
Gottfried Gerlach, Krefeld, Germany, assignor to Bayer Aktiengesellschaft, Leverkusen, Germany
Filed Mar. 30, 1970, Ser. No. 23,665
Claims priority, application Germany, Apr. 5, 1969,
P 19 17 599.6, P 19 17 743.6; Mar. 7, 1970,
P 20 10 886.5
Int. Cl. C22b 21/00; C22d 7/02; H05b 5/00
U.S. Cl. 75—10                                               5 Claims

ABSTRACT OF THE DISCLOSURE

A method and a device for carrying out chemical and metallurgical processes involving at least one electrically conductive medium in which the electrically conductive medium is liquid and wherein the liquid medium is under the influence of a rotating electrical field which causes its surface to be deformed and enlarged relative to when the field is inactive.

---

An enlargement in the phase boundary layer is often desirable for increasing the reaction velocity or material exchange, especially in heterogeneous chemical reactions or in metallurgical processes. Many different procedures are known for producing a large phase boundary and renewing the surface.

In this invention, an enlargement in the phase boundary layer is achieved by deforming the normally planar or flat surface of an electrically conductive liquid medium by means of a rotating electric field. Such a liquid surface resulting by these means is distinguished in that it is constantly renewed by a secondary flow. These internal mixing processes of the liquid are important not only for the transport of material but also for the transport of heat.

Further investigations on the properties of an electrically conductive liquid which is under the influence of a rotating electric field has shown that the planar surface of the liquid can be varied beyond the state of a paraboloid of rotation when the action of the rotating electrical field is increased, i.e. when the coil currents are increased.

The invention will be further described with reference to the accompanying drawings wherein:

FIGS. 1a, 1b and 1c are schematic views showing the effect on the disposition of a liquid within a vessel surrounded by a rotating electric field as the current is increased;

Figure 2:
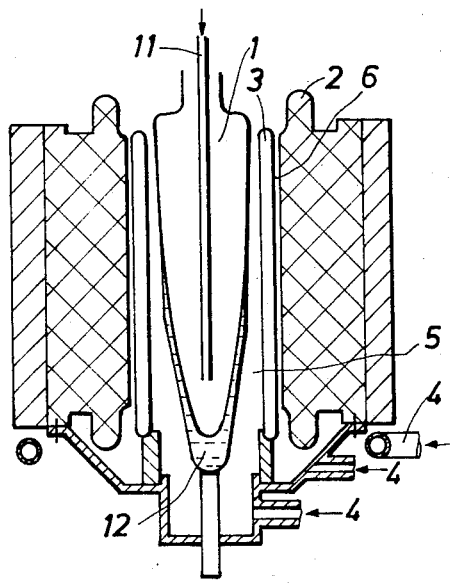
FIG. 2 is a schematic sectional view through an apparatus which is cooled with air.

Referring now more particularly to the drawings, the arrangement in FIG. 1a shows how a normally planar liquid surface is modified by a rotating electric field operating at very low current intensities. In the arrangement shown in FIG. 1b which is operated at higher current intensities than in the arrangement shown in FIG. 1a the surface of liquid is converted into a distance paraboloid of rotation. At current intensities which are higher than those applied in the arrangement shown in FIG. 1b the arrangement shown in FIG. 1c can be achieved without difficulty; in that arrangement the bottom plate of the vessel containing the liquid is entirely free from liquid and the liquid is distributed over the walls of the vessel in a substantially equally thin layer.

The invention relates to a method for carrying out heterogeneous chemical and metallurgical processes in an electrically conductive medium, wherein the liquid medium is converted into a thin layer rotating on the walls of the reaction vessel under the influence of a rotating electric field.

The apparatus for carrying out such processes comprises a vessel surrounded by electric windings wherein the windings are arranged as pole windings in the manner of a stator of a three-phase induction motor around the vessel.

The herein described process can be adopted with advantage for reacting melts, e.g. metal melts, with gaseous reactants, or for metallurgical processes, for example the degasification or gasification of metal melts in continuous operation which is possible in contrast to the prior art. The new process may also be used for carrying out other reactions.

The degasification of melts is effected at a reduced pressure; depending on the properties of the melts under treatment and the pressure range to be applied it may be necessary to operate at different pressure levels in various stages of the process, i.e. degasification initially at reduced pressure followed by operation at normal pressure.

As mentioned above the herein described process can be adopted for the degasification of melts as well as the gasification of melts so that the process according to the invention can be used for refining processes. Thus for example, it is possible to effect oxidation of undesired components in metal melts or to carry out a reduction. Any gaseous product formed in the gasification process, e.g. carbon monoxide can subsequently be removed at reduced pressures, e.g. by successively passing the melt through two apparatuses which are kept under the influence of a rotating electrical field, gasification being effected in the first step and degasification being effected in the second step. Of course a great number of other combinations in the processing of metals are possible within the scope of the invention.

The process is especially suitable for reacting melts, such as metal melts, with gaseous reactants, but may also be used for other reactions, e.g. chemical reactions. Removal of the heat of reaction sometimes entails technical difficulties in exothermic reactions with a high reaction enthalpy. Thus, for example, it may be necessary to keep the reaction volume low or to resort to measures such as use of a fluidised bed or circulation of the reaction mass in order to remove the heat of reaction, under the required conditions. Unexpectedly advantageous conditions were found for the removal of the heat of reaction from a liquid reactant which is under the influence of a rotating electric field. If there is a very large temperature difference between the liquid reactant and the cooling medium, considerable quantities of heat per unit of surface area can be removed. Owing to the thorough internal mixing of the liquid, the temperatures employed for the cooling medium may be considerably below the melting point, e.g. of a metal melt, without the liquid solidifying on the cooled wall, provided that the reaction enthalpy is sufficiently high. Chemical reactions may be carried out continuously by this method using the apparatus according to this invention.

Figure 3:
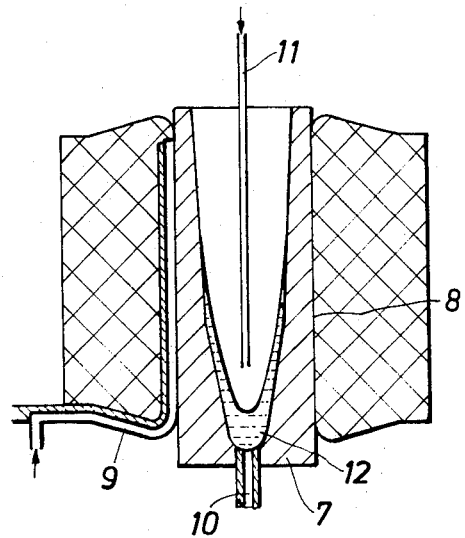
FIG. 3 is a schematic sectional view through an apparatus which is liquid cooled.
Figure 4:
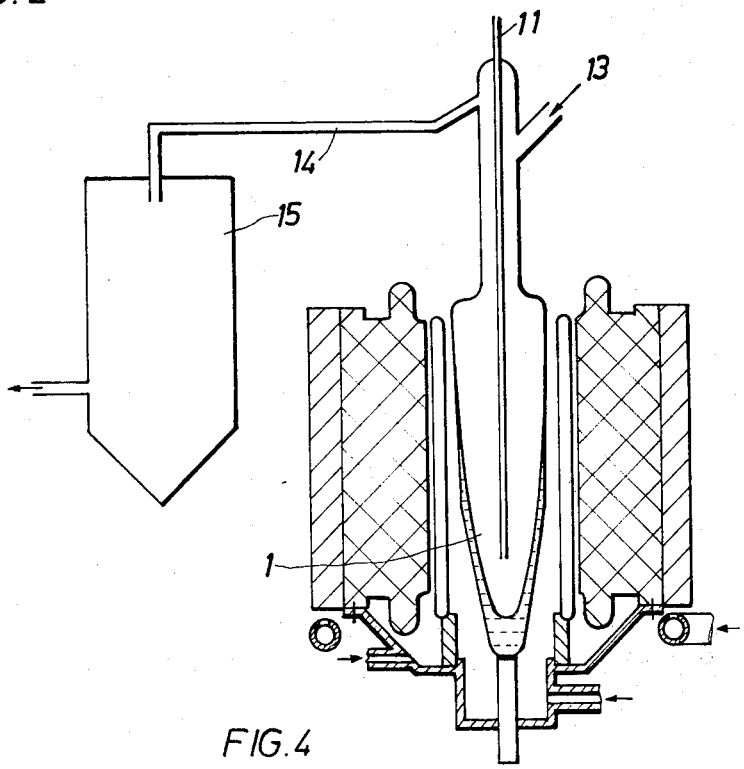
FIG. 4 is a schematic sectional view through an air cooled apparatus suited for the production of aluminum chloride.
Figure 5:
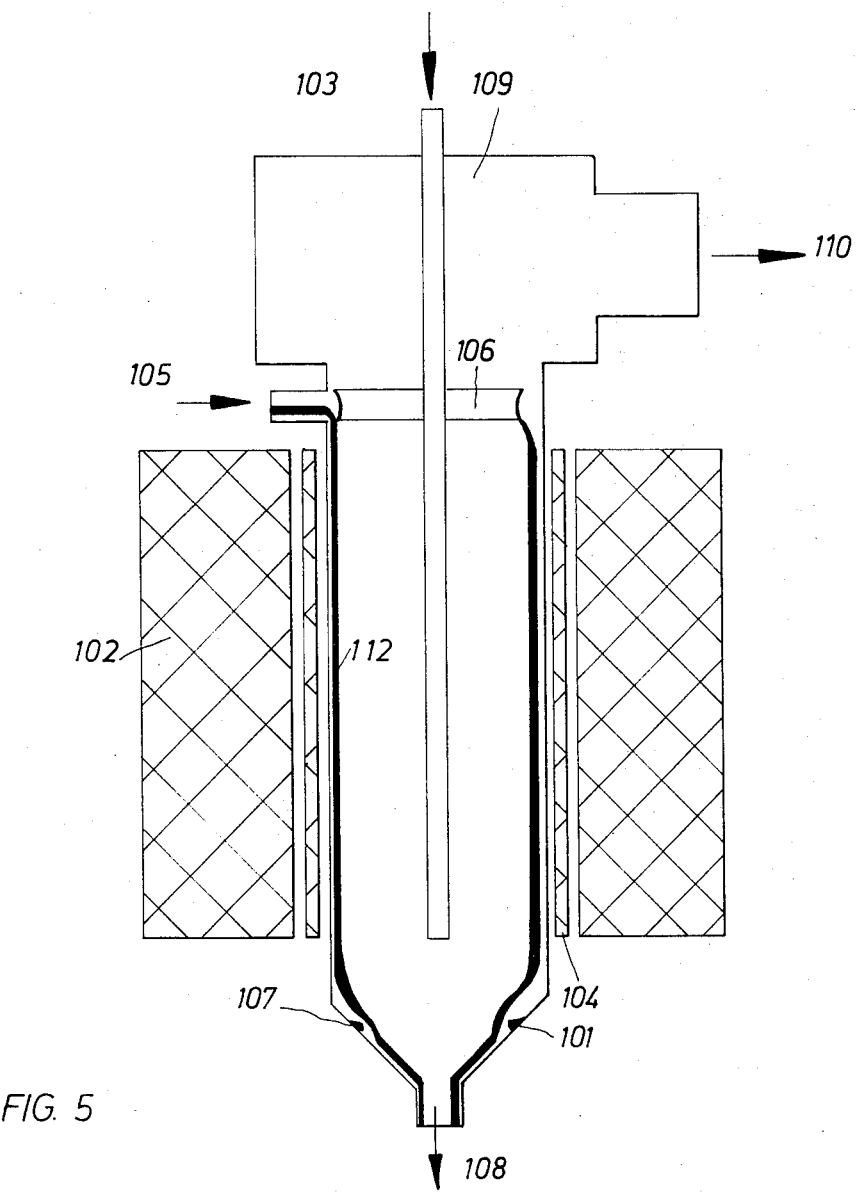
FIGS. 5 and 6 are schematic sectional views through two other embodiments of apparatus, especially suited for carrying out metallurgical reactions.
Figure 6:
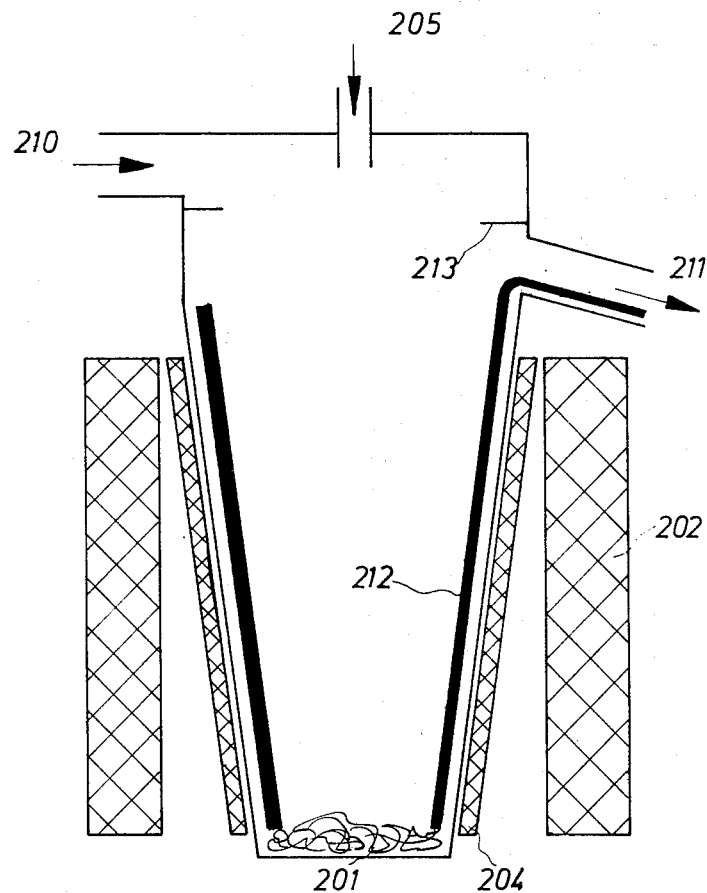

The method of carrying out the process of the invention is explained more fully in FIGS. 2 to 6. In FIG. 2 1 is a reactor, 2 a coil, 3 a radiation shield, 4 a feed pipe for a cooling medium, 5 and 6 are gaps and 12 is the liquid medium. In FIG. 3 7 is a reactor, 8 a sheet back column, 9 a water cooled electric conductor, 10 and 11 are feed pipes and 12 the liquid medium. In FIG. 4 11, 13, 14 are feed pipes and 15 is a condensation vessel. In FIG. 5 101 is a reaction vessel (reactor), 102 the electric rotating field, 103 and 105 feed pipes, 104 a radiation shield, 106 a distributor ring, 107 vessel confining rings, 108 and 110 outlets, 109 the top of the apparatus. In FIG. 6 201 is a conical reaction vessel, 202 the electrical rotating field, 204 the radiation shield, 205, 210 and 211 are inlets or outlets, 212 is the liquid medium and 213 a protective screen. In FIG. 2, the reactor 1 is made of quartz or ceramic material; under certain conditions, suitably constructed metal reactors with protective coatings may also be used. The rotary field is produced by a coil 2 which is built on the same principles as the stator of rotating current motors. In particular, the speed of rotation of the rotating field is determined by the number of poles and the frequency of the electric current. By the choice of a suitable frequency, it is possible to improve the value for cos $\varphi$ which is low as a result of the considerable air gap in the bore. With air gaps of about 30 mm., values of cos $\varphi = 0.3$ have been measured in the case of a three-phase alternating current of a frequency of 50 cycles per second when the coil was star connected. The voltage applied was e.g. about 50 v. The voltage is advantageously varied by means of a variable transformer or the like so that the formation of the non-planar surface of rotation can be effected gradually.

When an air cooling system is employed, it has been found advantageous to protect the electrical part of the apparatus from the influence of excessive heat by means of a radiation shield 3. The cooling air from 4 is advantageously divided between the gap 5 between the reactor and the radiation shield, the gap 6 between the radiation shield and the sheet pack, and the cooling of the electric coil.

When a water cooling system is employed, as shown in FIG. 3, the reactor 7 is installed in the bore of the sheet pack column 8 which is also capable of withstanding pressure if necessary. The heat of reaction is removed by the water cooled electric conductor 9 of the apparatus. Considerable quantities of heat can be removed in this way.

The component which is a liquid during the reaction may be fed into the reactor in solid or liquid form. Both solids, e.g. the metal granules, and the liquid can be fed in from the top. In addition, liquid can also be pumped into the reactor from below through a suitable connection 10. An opening at the bottom of the reactor also allows for the removal of residues such as slags. Impurities of this kind are due mainly to incomplete purification of the reactants. The apparatus itself, if suitably designed, enables substances of a very high purity to be produced because seams e.g. in the brickwork, can be avoided owing to the fact that the apparatus has substantially smaller dimensions than other arrangements capable of the same output.

The gaseous reactants are supplied from the top through a pipe 11 which is arranged essentially centrally. This supply pipe 11 is advantageously arranged to be adjustable along the axis. This allows the amount of gas actually reacting with the liquid 12 to be varied. It also enables disproportionated reactions to be carried out without the production of unwanted compounds and without having to supply gas at some other point.

FIG. 5 shows an arrangement which allows the degasification of metals in a simple and continuously operating apparatus. Under the influence of the rotating electrical field 102 the metal melt 101 assumes the surface form shown in FIG. 5 and permits carrying out the gasification reactions at diffusion paths which are extremely shortened as compared with the previously known apparatus as well as to perform permitting carrying out metallurgical refining processes by means of gases introduced via pipe 103. The heat insulation 104 reduces heat losses from the melt which is tangentially fed to the apparatus via the pipe 105. The distribution is promoted by means of a distributor ring 106. The average residence time of the metal melts in the apparatus is influenced by the charging mass flow, the field excitation of the rotating electrical field and by vessel confining rings 107 which are known per se. The liquid under treatment flows off via the pipe 108, while the opening 110 provided at the top 109 allows the discharge of gas. In the arrangement in FIG. 6 the reaction vessel is conically shaped, the the metal is admitted from the top in a free fall and is distributed on the walls of the vessel in form of a thin layer 212 under the influence of the rotating electrical field 202. When the current intensities are adequate, the finished metal flows off via the pipe 211, while the gases are withdrawn via the pipe 210. The protective screen 213 prevents the melts from ascending higher than desired.

The apparatuses shown in FIGS. 5 and 6 are vertically arranged; this arrangement is a preferred embodiment according to the invention. However, the rotational speed of the liquid as determined by measurements is so high that the influence of the force of gravity in relation to the centrifugal forces is quite low, whereby an inclined arrangement as well as a horizontal construction may be used according to the invention.

The method can be applied to many processes, especially those which have special mixing problems, e.g. heterogeneous reactions. The method is especially suitable for the reaction of metal melts with gases, e.g. for the production of metal halides. Metal and metalloid halides, which are not salts, e.g. chlorides and bromides of aluminum, tin and zinc, can be prepared especially easily by the process of the invention.

The method is also suitable for reactions in which the liquid phase is not a reactant, e.g. a molten salt in which substances which react with the gas, especially metals or metalloid, are suspended.

The process is generally used in heterogeneous reactions of the type in which the boiling point of the reaction product is so low that product escapes from the liquid reactant at the reaction temperature employed and separation of the reaction product from the gaseous reactant, which may have to be used in excess, does not entail any difficulties.

The method of the invention will be described more fully below by means of the examples.

EXAMPLE 1

To prepare aluminum chloride ($AlCl_3$), the reactor 1 as shown in FIG. 4, which had a volume of 920 ml. was filled with 200 g. of aluminum granules which had been preheated with hot nitrogen at 250° C. A stream of chlorine was then established at 1200 Nl./h. (liters per hour at normal conditions) and introduced into the reactor through the pipe 11. The metal melted rapidly and under the influence of the rotary field the surface assumed the form of a paraboloid of rotation. The reaction between aluminum and chlorine was very vigorous with powerful luminescence. The heat of reaction was removed by an air cooling system, and the metal contents were mixed by the rotary field. The intensive mixing prevented solidification of aluminum on the wall of the reactor. Fresh granules were introduced through the pipe 13 to replace the aluminum used up. The height of the chlorine inlet pipe 11 was adjusted so that part of the chlorine remained unreacted, the theoretically calculated "chlorine excess" being about 5%. The formation of aluminum subhalide ($AlCl$) was thereby prevented. The reaction products were removed through the pipe 14. Solid $AlCl_3$ separated in the condenser 15 in the form of a white salt. A voltage of 62 v. was applied to the star connected coil to produce the rotary field. The resulting current consumption was 16 a. and the value for cos $\varphi$ was found to be 0.294. The rotary electric field rotated at the rate of 3000 revs./min.

EXAMPLE 2

The apparatus used in Example 1 was used for preparing tin tetracholoride ($SnCl_4$). The reactor was filled with tin granules and put into operation as described after the metal had been preheated. A stream of chlorine of 800 Nl./h. was employed. The reaction product leaving the reactor was condensed in a condensation apparatus which had several more stages than shown in FIG. 4 so that the residual gas leaving the apparatus was absolutely freed from tin tetrachloride vapor. The tin tetrachloride was obtained in the form of a clear liquid if the apparatus was protected against contact with air or atmospheric moisture (fresh metal granules were fed in through charging valves operated with nitrogen as a protective gas).

What is claimed is:

1. A process for effecting a chemical reaction between a member selected from the group consisting of molten metals and molten metalloids and a halogen gas to be added thereto, said process being characterized by the removable of considerable quantities of heat per unit surface area, which comprises supplying said molten metal or metalloid to a vessel having a cylindrical inner wall, establishing a rotating electric field about said vessel whereby said molten metal or metalloid is caused to rotate and under the influence of centrifugal force forms a substantially thin liquid film along the inner wall of said vessel, and adding said halogen gas to said vessel whereby said halogen gas interacts with said molten metal or metalloid at the enlarged surface of said liquid film.

2. Method as claimed in claim 1, wherein the heat produced in said process is removed by external cooling.

3. Method as claimed in claim 2, wherein said cooling is effected by air or by a liquid.

4. Method as claimed in claim 1, wherein said liquid is a metal melt.

5. Method as claimed in claim 1, wherein said rotating liquid is a member selected from the group consisting of molten aluminum, zinc or tin and said reactant is chlorine.

References Cited
UNITED STATES PATENTS

| | | | |
|---|---|---|---|
| 2,139,853 | 12/1938 | Rohn | 75—11 |
| 3,295,960 | 1/1967 | Parlee | 75—93 R |
| 2,946,834 | 7/1960 | Junker | 75—10 R |
| 3,230,073 | 1/1966 | Ericsson | 75—10 R |
| 3,206,301 | 9/1965 | Daubersy | 75—49 |
| 3,533,777 | 10/1970 | McTaggart | 75—10 R |

HYLAND BIZOT, Primary Examiner

P. D. ROSENBERG, Assistant Examiner

U.S. Cl. X.R.

13—33; 75—68